United States Patent [19]

Nussdorf

[11] 4,305,420

[45] Dec. 15, 1981

[54] AUTOMATIC WATER OR LIQUID SAFETY VALVE ASSEMBLY

[76] Inventor: Oscar Nussdorf, 2237 SW. 15th Pl., Deerfield Beach, Fla. 33441

[21] Appl. No.: 131,480

[22] Filed: Mar. 18, 1980

[51] Int. Cl.³ .................... F16K 33/00; H01H 29/04
[52] U.S. Cl. .................... 137/312; 73/313; 137/392; 137/429; 200/61.04; 200/84 R; 307/118; 361/178
[58] Field of Search ............ 73/313; 200/61.04, 61.06, 200/61.07, 84 R; 137/312, 392, 429; 307/118; 361/178; 340/604, 605, 623, 624

[56] References Cited

U.S. PATENT DOCUMENTS

| | | | |
|---|---|---|---|
| 1,179,537 | 4/1916 | Mapel | 200/84 R |
| 2,347,544 | 4/1944 | De Costa et al. | 137/392 |
| 2,432,367 | 12/1947 | Andresen | 200/61.04 |
| 2,717,990 | 9/1955 | Person | 340/624 |
| 3,473,553 | 10/1969 | Collins | 137/312 |
| 3,770,002 | 11/1973 | Brown | 137/312 |
| 4,246,575 | 1/1981 | Purtell et al. | 200/61.04 |

Primary Examiner—Martin P. Schwadron
Assistant Examiner—G. L. Walton
Attorney, Agent, or Firm—Alfred E. Miller

[57] ABSTRACT

An automatic water safety valve assembly having sensors adapted to be placed in various locations on the floors of a building so that an expandable element in each of the sensors having an electrically conductive plate expands when wetted to operate a circuit which causes the water safety valve to close and shut off the main water line to the building. The valve, when activated, also operates a power interrupter which deactivates the connections to the device from the AC power source.

4 Claims, 9 Drawing Figures

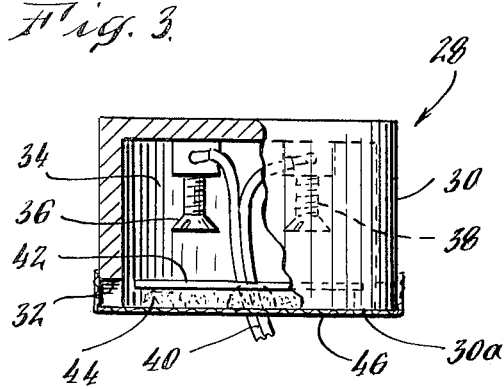
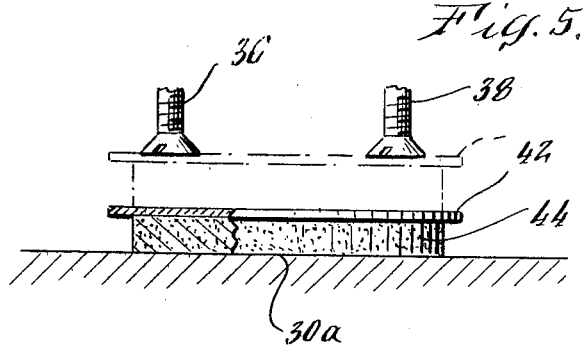
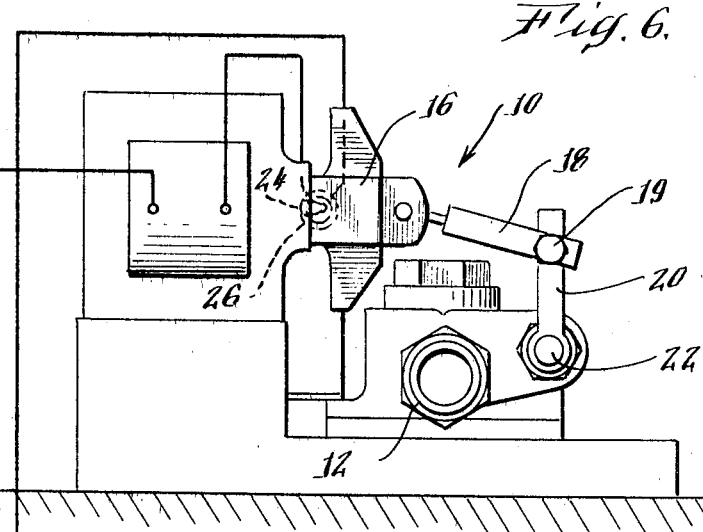
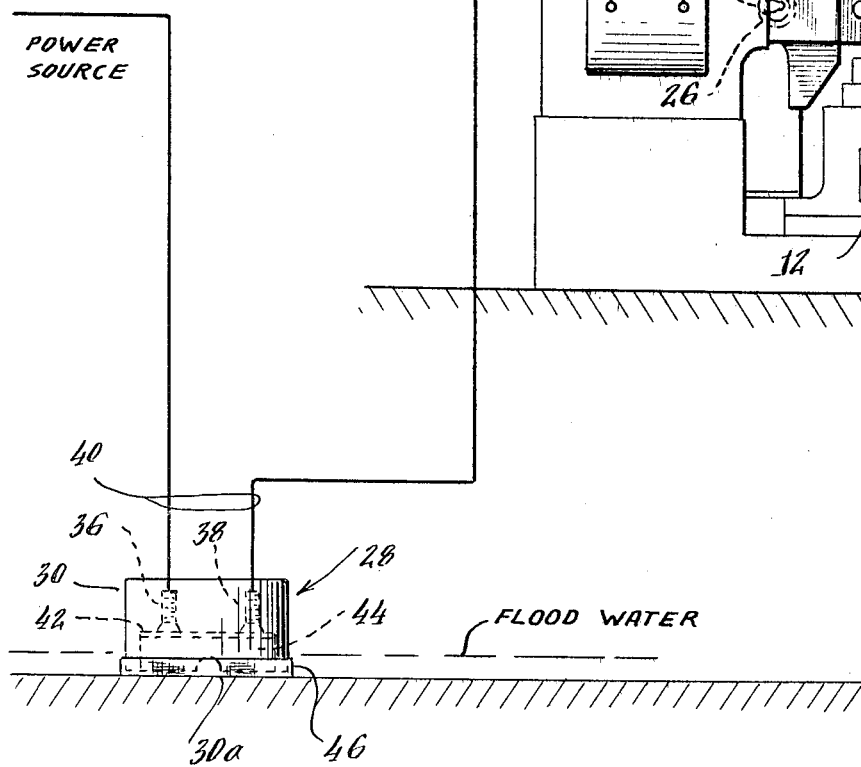

AUTOMATIC WATER OR LIQUID SAFETY VALVE ASSEMBLY

BACKGROUND OF THE INVENTION

Automatic water shutoff systems for appliances, such as automatic washing machines, water heaters, and the like are known for cutting off the water supply to an appliance in the event of a malfunction, such as leaking or overflowing, which may cause flooding in the room that the appliance or machine is located. An example of a leak detection system is described in U.S. Pat. No. 3,770,002, issued Nov. 6, 1973, which shows an electrical water sensor having electrical characteristics which vary when the sensor is wetted, and means for actuating the shutoff valve to a closed position in response to the changes in sensor characteristics. The sensor is an electrical structure comprising a base capacitor plate separated by a layer of porous wick-like dielectric material, which functions as capillary means. The arrangement shown and described in the foregoing patent is rather complicated, and depends upon the wetting of the sensor sufficiently to change the leakage resistance of the detector, and thereby the operating state of a relaxation oscillator. It should be apparent that the reliability of such a device is severely in doubt, and that the use of simple operating members, such as in applicant's construction, greatly increases the reliability and repeatability of the device. U.S. Pat. No. 3,473,553 is another example of a prior art construction directed to an automatic water cutoff for a water heater in which a chamber underneath the heater tank is located for collecting leakage. In addition, the disclosure describes and shows a float that is elevated by water to activate a microswitch, for cutting off the water supply to the water heater.

Neither of the above described patents have the construction and concept of a simplified water safety valve for domestic and industrial use in accordance with present teachings, which has consistent reliability in shutting off the main water or liquid supply when there is either freezing and bursting of the pipes, or leakage in the pipes in either a residence or other type of building.

The present invention relates to a water safety valve, and more particularly to a fast closing valve operated by an electric solenoid which senses even a small amount of water on the floor of the room. It is a feature of the present invention to provide a fast-acting valve mechanism for shutting off the main water supply to a building, upon leakage or bursting of pipes within the structure.

It is another feature of the present invention to have the capability of placing water or liquid sensors in any selected location in a building. In addition, the number of water sensors employed can be varied in accordance with the user's requirements.

The present invention includes the additional feature of a power interrupter for shutting off the power source to the valve assembly, immediately after the main water shutoff valve has been closed.

A further feature of the present invention is the ability to adapt the present invention to new construction wherein the assembly for shutting off the mains water input to the building, as well as an AC power interrupter, can be mounted directly within the walls of the new construction so that the mechanism is hidden from view, leaving only the small water sensors visible in vulnerable areas, such as adjacent to sinks and water tanks. The unit can also be strategically placed near the main water line into the building.

It is another feature of the present invention to provide a liquid or water sensor which, after being contacted by the liquid, acts positively to make an AC circuit whereby the water shutoff mechanism is activated, and a split second later the power source to the AC circuit is cut off.

Another feature of the present invention is a safety valve arrangement for both water and any other type of liquid, such as liquid chemicals. Thus, the automatic safety valve and power interrupter in industrial applications, not only prevents further liquid flooding after detection, but also prevents fires and explosions by opening the electric circuit within the split second after the main liquid shutoff is accomplished.

A further feature of the present invention is the use of the present water safety valve mechanism for marine craft, such as power boats, whereby the shutoff valve would be incorporated in the exhaust pipes of the boat to prevent taking on of water in the boat through said pipes.

In order that the invention will be more clearly understood, it will now be disclosed in greater detail, with reference to the accompanying drawings, in which:

FIG. 1 is a top plan view of the water safety valve constructed in accordance with the teachings of the present invention, with the liquid sensor omitted.

FIG. 2 is a side elevational view of FIG. 1.

FIG. 3 is a sectional view of the water or liquid sensor device.

FIG. 4 is a sectional view of the water or liquid sensor taken on the lines 4—4 of FIG. 3.

FIG. 5 is a sectional view of the movable element of the water or liquid sensor in both circuit-breaking and circuit-making positions.

FIG. 6 is a side elevational view, partly in section, of the water safety valve, as well as the water or liquid sensor device, the latter being in position on a floor with flood water contacting the movable element thereof.

FIG. 7 is an elevational view of an industrial application of the present invention utilizing an AC motor for opening and closing a gate valve in response to movement of the water or liquid sensor.

FIG. 8 is an elevational view, partly in section, of a power interrupter which is responsive to a water or liquid sensor, to thereby cut off power after the safety valve has been activated, upon the occurrence of flooding conditions in a building.

FIG. 9 is a side elevational view of a water safety valve mechanism in accordance with the invention, and applied to a water craft motor exhaust pipe.

BRIEF DESCRIPTION OF THE DRAWINGS

Referring to FIGS. 1–6, a water safety valve mechanism referred to generally by the reference numeral 10 is shown in FIGS. 1 and 2. A water pipe 12 is connected to the mains water line (not shown) which enters the building from the outside. The latter is connected to the city water supply, or in the case of artesian wells, to the water line through which the water is pumped into the system from a well. A suitable valve 14, known as the main water valve is inserted in the line 12. This valve is of the type that is commonly known as a wedge type gate valve. The valve is preferably fast closing, and the operation of the same is controlled by an electric solenoid 16. The solenoid is connected by a linkage 18 and 20, which is pivoted at 19, to operate a valve controlling arm 22, to thereby control the opening and closing of fast closing valve 14.

Figure 1:
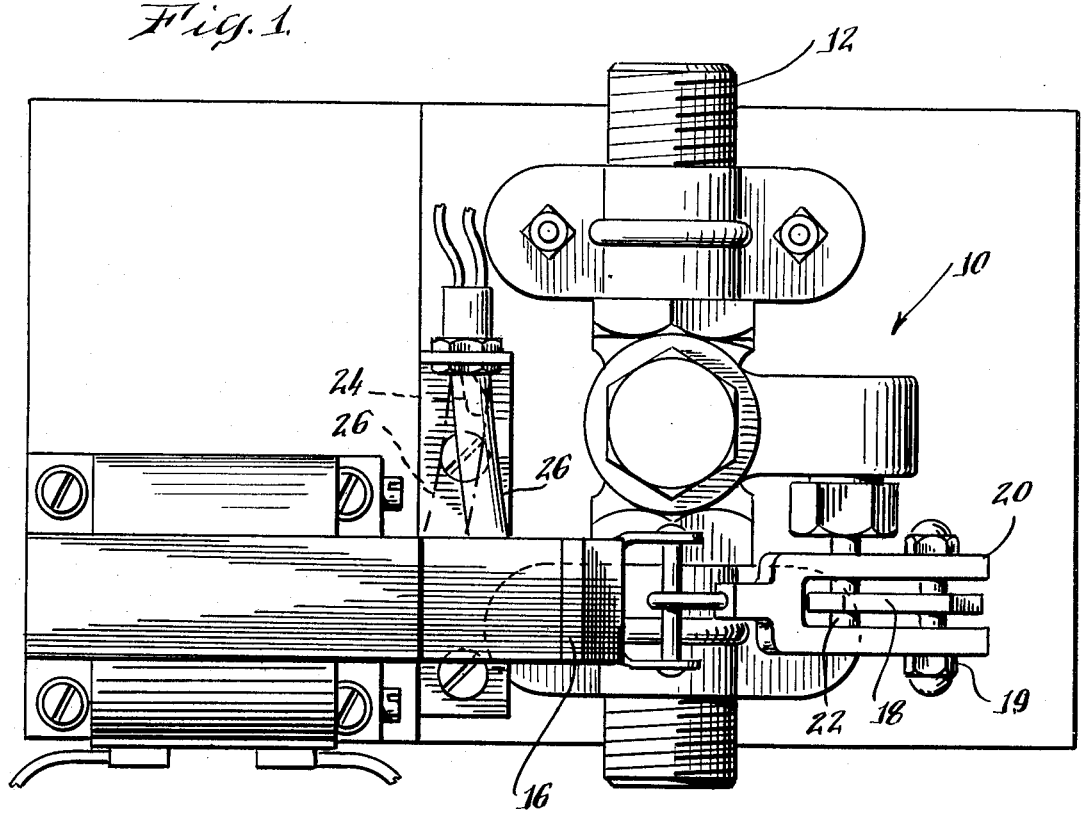
Figure 2:
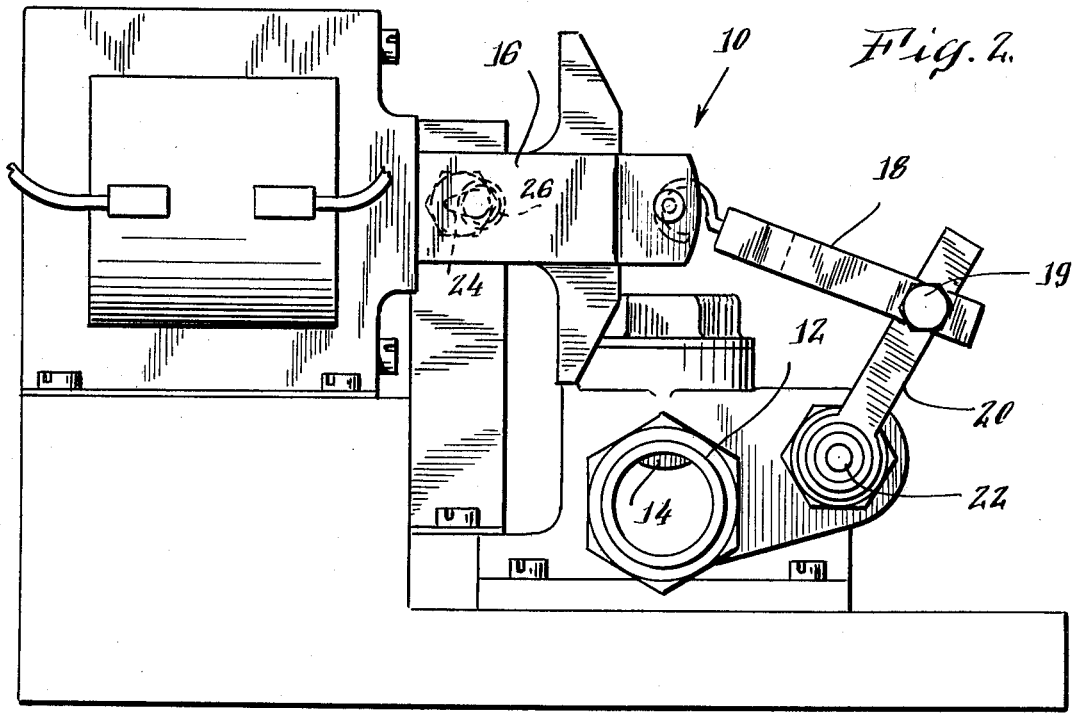

Located next to the solenoid 16, is a normally open toggle switch 24 that is operatively connected to the solenoid, and is mounted on a bracket adjacent to said solenoid. The toggle switch 24 is surrounded by flexible tubing 26 which is adapted to assume two positions, as seen in FIG. 1. It should be noted that the flexible tubing surrounding toggle switch 24 is adapted to change positions of the switch depending on the movement of the solenoid 16. Thus, when the solenoid moves forward the gate valve 14 is closed by means of movement of linkages 18 and 20. However, in rapid succession the toggle switch 24 moves to the right in FIG. 1 to its off position, so that the flexible tubing assumes the full line position shown therein, thereby cutting off the power source to the electrical circuit. Thus, when the solenoid is energized it moves the linkages 18 and 20 to the right as seen in FIG. 1, carrying with it the flexible tubing 26 which engages the toggle switch 24 to move the switch 24 to the position shown by the full lines in FIG. 1. In order to reset the water safety valve assembly the valve is open manually and the switch 24 is manually pushed to the left as shown by the dotted lines in FIG. 1 to its activated position. This safety measure prevents the electric circuit from staying on after the safety valve has been closed, thereby creating a potential hazard with respect to fire and explosion. The gate valve remains closed due to the frictional binding as a result of the wedge action between the valve and its seat in assuming the close position. Thereafter, in order to open the valve, a certain amount of manual force must be applied to the valve.

An important part of the present overall system is the water or liquid sensor referred to generally by the reference numeral 28, and which may take the form of a disc. It should be understood that other configurations of the present sensor are acceptable providing the elements of the sensor are sufficiently similar. In the present case the disc-like housing 30 is provided with four openings 32 in the bottom, floor engaging surface 30a. The housing 30 is provided with a hollow chamber 34 in which terminal members 36 and 38 are secured to the undersurface of the top of the sensor. The terminals 36 and 38 are connected by means of electrical lines 40 to an AC power source (not shown). The movable element within the hollow chamber 34 is a freely movable, metallic, or other electrically-conducting disc-like plate 42, whose diameter is slightly less than the inside diameter of the housing 30. The metal plate 42 is provided with an expandable element 44, which, in the present case, is a sponge in compressed form when dry, having its upper surface cemented or otherwise affixed to the bottom surface of plate 42. It should be evident that the expandable element which is shown in the present illustration as a sponge, can be any other type of porous material that expands upon being wetted by water, or other liquid. Thus, the element, and its sponge, can be referred to as a sensor disc, which is captured in the housing chamber 34 by means of a screen 46, that may be fabricated from a fiberglass screen cloth, that is glued or otherwise affixed to the undersurface 30a of the housing 30. Therefore, the sensor disc located within the housing 30 is freely movable vertically, but is retained in the entire assembly of the sensor 28 by means of the screen 46. In addition, water or other liquid can penetrate into the chamber 34 at a level close to the floor surface by means of openings 32 in the sensor 28.

The sensor 28 may be used individually or in multiples, and may be placed near the main water line entering the building. It is also possible to mount the safety water valve assembly, and the power interrupter mechanism within the walls of new building construction, leaving the sensors and their connecting lines to the valve and power interrupter only visible in a house or building. This assembly makes the entire arrangement unobtrusive. It is also important to place the sensors in vulnerable locations in a house or building, where flooding may occur upon the rupture of a water or other type of liquid pipe line.

In the event of a rupture of a water or liquid pipe line in a house when the sensor or sensors are in position, water or liquid will penetrate through one or more of the openings 32 in the liquid sensor 28. It should be noted that experiments have shown that one quarter cup of water within a liquid sensor will activate the unit. Thus, when the water or liquid comes in contact with the sponge of the sensor disc, the sponge absorbs the water and swells, so that the sponge which initially was compressed, as shown in full lines in FIG. 5, upon wetting swells or expands to elevate the metal plate 42 to engage and bridge terminals 36 and 38, to thereby activate the electric circuit and operate the solenoid 16 which, through linkages 18 and 20, closes the gate valve 14.

Figure 7:
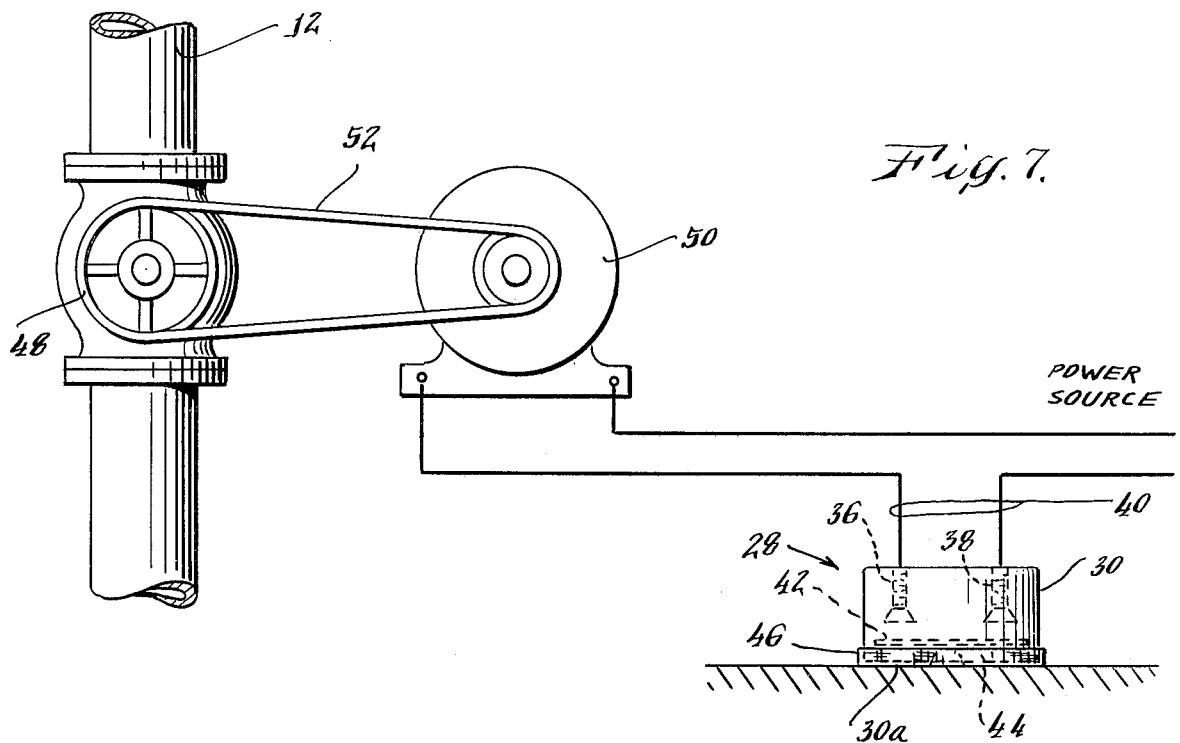

FIG. 7 shows another embodiment of the present invention, relating to an industrial application, and involves the use of a large gate valve 48 that is operated by a motor 50 through a chain drive 52. In the embodiment shown in FIG. 7, the sensor 28, is used, together with an element 42 having a sponge 44, or other similar element, which operates in a manner described hereinbefore. In the embodiment shown in FIG. 7, references which are the same as those in FIGS. 1-6 are indicated by the same reference numerals.

Figure 8:
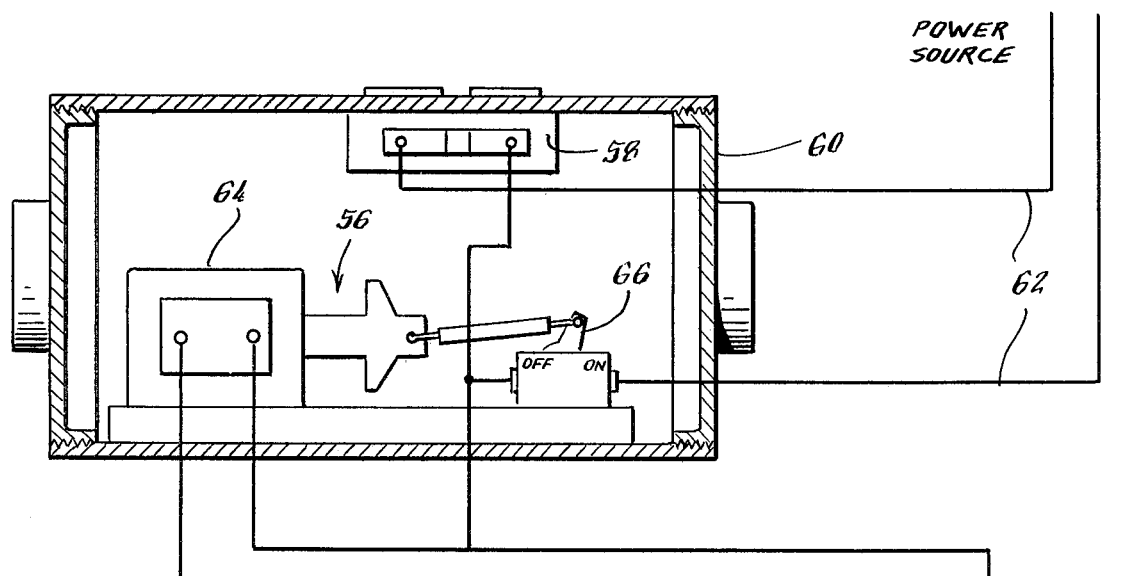

FIG. 8 is a power interrupter which has been constructed in accordance with the teachings of the present invention, and which includes a liquid sensor 28, as described hereinbefore, connected to a power interrupter, referred to generally by the reference numeral 56, as well as the power receptacle 58 within the housing 60. Also connected to power interrupter are power lines 62 to the power interrupter and the power receptacle, respectively. The liquid sensor 28 is shown positioned on the floor with openings 32 adjacent to the floor surface. When water or other liquid on the floor passes through the openings 32, and wets the sponge 44 which consequently expands, the metallic plate 42 rises to a level where it engages and bridges spaced terminals 36 and 38 to make a complete circuit to the power source. Thus, the solenoid 64 of the power interrupter is operated to move the switch 66 from its normally "on" position to its "off" position. Therefor, the power interrupter 56 functions to cut off the power supply to a building when flooding occurs, and is operated in conjunction with the water or liquid shut-off valve in a manner shown in FIG. 1. However, the power interrupter, as shown in FIG. 8, must be coordinated with the valve operation so that power shutoff occurs immediately after the valve 14 is closed, and not prior to closure.

It should be evident that the present water or liquid safety system is fast-acting, yet simple in construction and reliable in operation. After one use, the inexpensive sensor disc 28 is disposed of, and a new disc having a metal plate 42 and expandable element or sponge 44 secured thereto is substituted therefor, and connected to electrical lines 40. In the new sensor disc the metal plate is spaced from engaging the terminals 36 and 38, thereby maintaining the circuit in an open position. However, upon the occurrence of another flooding condition, the sponge when contacted by water or liquid will absorb the liquid and expand, causing the metal plate 42 to rise, to make electrical contact with the terminals 36 and 38, as seen in FIG. 5 in dotted lines. It should therefore be noted that the sensor becomes repeatably operative. Moreover, it should be evident that, besides domestic and industrial applications, the present combination assembly can be used, for example, in nuclear installations, oil pipe lines, and underground sewers. Furthermore, other types of expandable materials other than sponges may be used in connection with electrically conducting plate 42.

Figure 9:
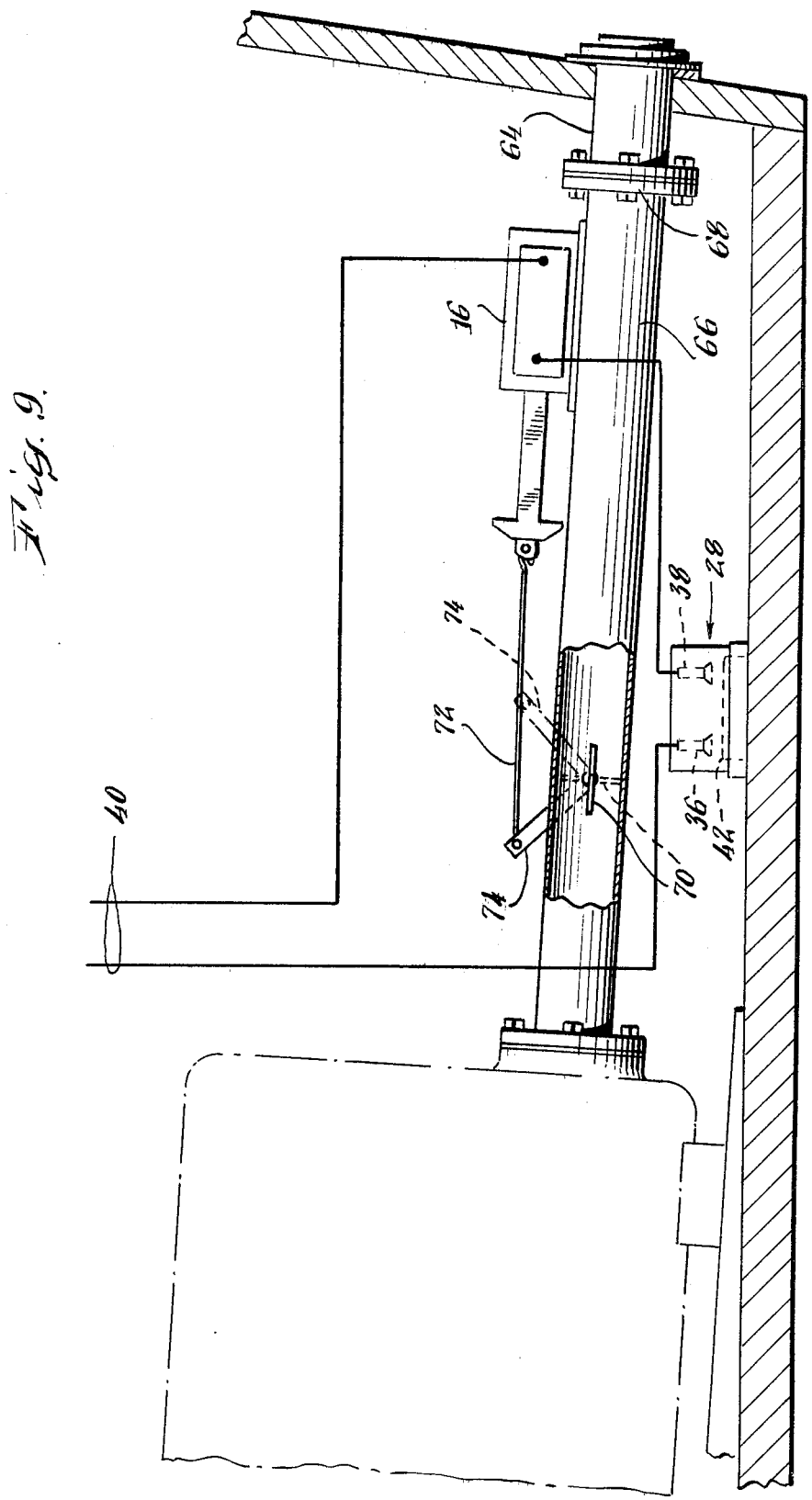

As seen in FIG. 9, the above-described assembly is shown applied to a valve for opening and closing an exhaust pipe of a marine motor. The exhaust pipe 64 is connected to a valve pipe housing 66 by means of flange assembly 68. The valve housing pipe 66 is provided with a valve member in the form of a valve disc 70 that is connected to solenoid 16 through a rod 72 pivotally attached to lever arm 74. The sensor 28 is placed in the bottom of the water craft which operates in the manner described hereinbefore. Thus, when the water craft takes on a certain amount of water in the interior of the hull, the sensor 28 is activated to thereby operate the solenoid which, in turn, moves the linkage to the valve 70 to thereby move the valve 70 from its normally horizontal position to a vertical position, as shown in dotted lines. Thus, the exhaust pipe is closed, and seawater, or the like, cannot enter the motor through the exhaust system.

While several embodiments of the present invention have been disclosed and described, it will thus be apparent that variations and modifications may be made therein without departing from the spirit and scope of the invention as defined in the following claims.

What is claimed is:

1. A combination of an automatic liquid or water safety valve assembly having an electric power source and a solenoid-operated wedge type valve and a valve seat in a pipe connected to a water main, comprising: a hollow liquid sensor having a top, a pair of spaced electric terminals projecting from the undersurface of said top and extending into the interior of said hollow liquid sensor, said hollow sensor having an open bottom and a screen secured to the bottom edge of said sensor, at least one opening in said sensor adjacent to the bottom edge thereof permitting liquid on a floor to enter said hollow sensor, an element within the confines of said liquid sensor which is movable vertically and is provided with an electrically conductive plate on the top surface thereof, said movable element being of sponge-like expandable material whereby when wetted expands vertically to elevate said electrically conductive plate into engagement with said spaced terminals to bridge the same and complete an electrical circuit to energize said solenoid operated water safety valve to close and to remain closed due to the binding of said wedge type valve on said valve seat, and flexible switch means coacting with said electrical circuit and being operatively connected to said solenoid to be moved by the latter momentarily after the solenoid is energized to shut-off the electric power source.

2. The combination as claimed in claim 1 wherein said expandable material secured to an electrically-conductive plate is a sponge.

3. The combination as claimed in claim 1 wherein said electrically-conductive plate has dimensions which are slightly smaller than the interior diameter of said hollow liquid sensor.

4. The combination as claimed in claim 1 wherein said pipe having said solenoid-operated valve therein is an exhaust pipe of a marine motor, said valve being provided with a lever arm, and linkage means connecting said lever arm to said solenoid whereby when said circuit is completed said solenoid becomes operative and acts to pivot said lever arm so that said valve moves from an open position to a closed position.

* * * * *